United States Patent [19]

Mulcahy et al.

[11] 3,861,709
[45] Jan. 21, 1975

[54] SHIFTABLE FIFTH WHEEL CONSTRUCTION

[75] Inventors: Harry William Mulcahy, Lansing, Ill.; John Allan Kent, Rolling Prarie; Francis Eli Madura, Whiting, both of Ind.

[73] Assignee: Amsted Ind., Inc., Chicago, Ill.

[22] Filed: July 12, 1973

[21] Appl. No.: 378,560

[52] U.S. Cl. ............................................. 280/407
[51] Int. Cl. ......................................... B62d 53/06
[58] Field of Search .......................... 280/407, 438

[56] References Cited
UNITED STATES PATENTS

| 2,860,891 | 11/1958 | Ramun | 280/407 |
| 2,900,194 | 8/1959 | Lay | 280/407 X |
| 3,170,716 | 2/1965 | Walther et al. | 280/407 |
| 3,722,914 | 3/1973 | Walther | 280/407 |

Primary Examiner—Stanley H. Tollberg

[57] ABSTRACT

A fifth wheel construction including a frame unit, a saddle unit slidable longitudinally on the frame unit, the saddle unit having a fifth wheel mounted on trunnions thereon, the frame unit including side rails having inwardly directed, longitudinally spaced sockets, the saddle unit having locking members on opposite sides movable laterally outwardly into the sockets, and means for withdrawing the locking members from the sockets; in one form the withdrawing means is manually operated, and in another, power operated.

5 Claims, 8 Drawing Figures

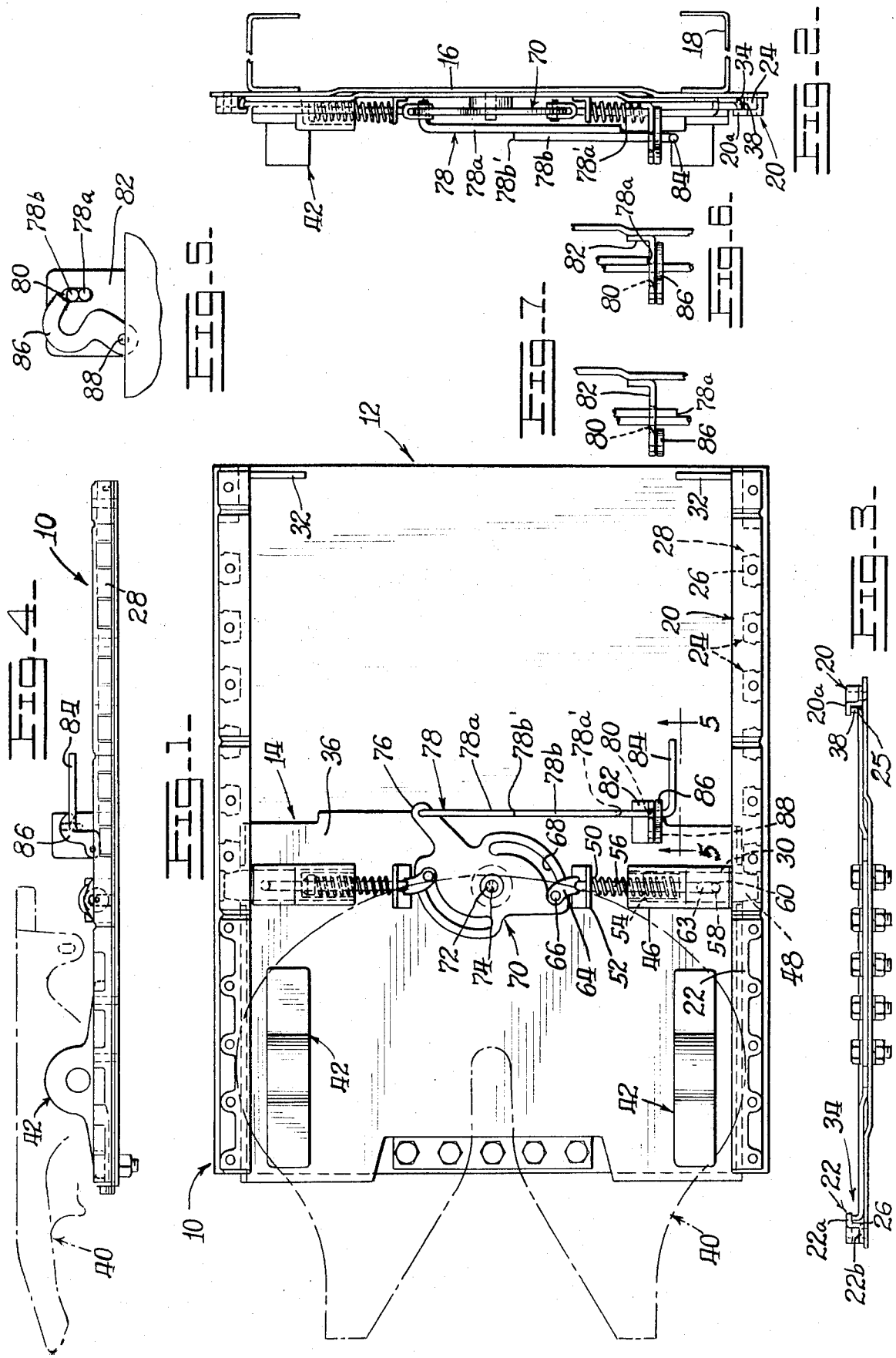

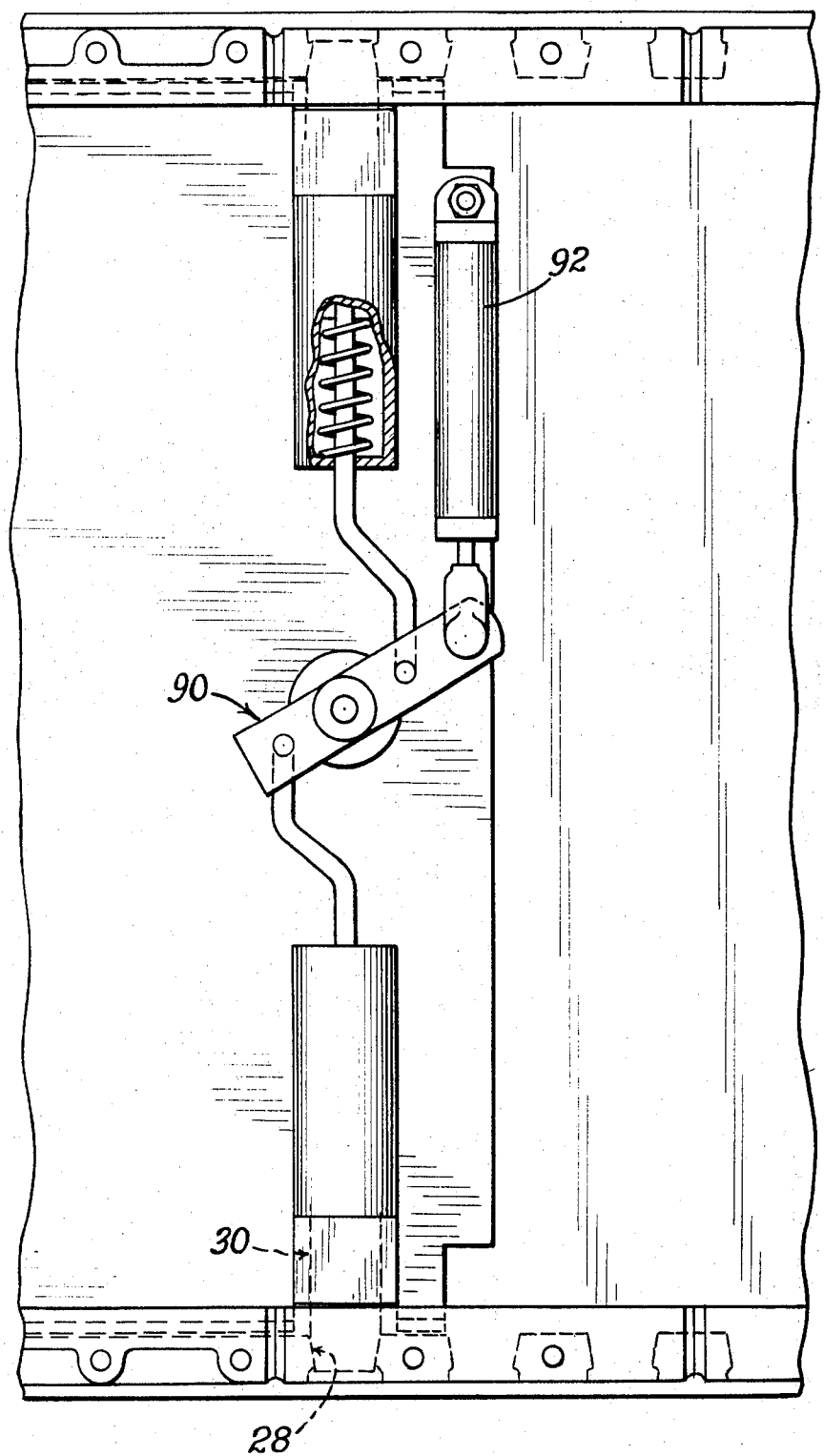

3,861,709

SHIFTABLE FIFTH WHEEL CONSTRUCTION

BACKGROUND OF THE INVENTION

The present invention resides in the field of fifth wheel construction or assembly for mounting a trailer on a tractor or truck, and means for adjusting the effective point of support of the front end of the trailer on the tractor according to disposition of the load in the trailer.

Broadly this kind of construction has been known before, and the present invention resides in a specific construction of device for accomplishing the overall effect indicated above.

OBJECTS OF THE INVENTION

A broad object of the invention is to provide a construction for use in a tractor-trailer vehicle with novel means for longitudinally shifting the effective point of support of the trailer on the tractor.

Another broad object is to provide a fifth wheel construction of the character indicated above which is of unusually simple construction and effective for carrying out the functions indicated.

Another object is to provide a tractor mounting assembly including a tractor frame unit, and a saddle unit mounted thereon in which the saddle unit includes a fifth wheel, and wherein the assembly includes a novel locking arrangement, and wherein the tractor frame unit includes sockets at the side edge thereof and the slidable saddle unit includes locking elements thereon movable laterally into the sockets for locking the saddle unit in position along the tractor frame unit.

A further and more detail object is to provide a construction of the character just referred to in which the sockets and locking elements are so shaped as to facilitate locking interengagement thereof, and in which the shape is such that the locking elements actually lead into the sockets, thereby eliminating the necessity for accurately positioning the slidable saddle unit relative to the selected sockets.

Still another object is to provide a device of the foregoing general character in which the locking elements on the slidable saddle unit are generally balanced so as to react against each other in moving into the sockets.

An additional object is to provide a device of the foregoing general character, including one form in which the device is manually operated and in another form in which it is power operated, both possessing the advantages above indicated.

DESCRIPTION OF A PREFERRED EMBODIMENT

In the drawings:

FIG. 1 is a plan view of the assembly of the invention;

FIG. 2 is a view from the right of FIG. 1;

FIG. 3 is a view from the left of FIG. 1;

FIG. 4 is an edge view from the bottom of FIG. 1;

FIG. 5 is a view oriented according to line 5—5 of FIG. 1 and showing a detail of FIG. 4 but with the hook element thereof in unlocking position;

FIG. 6 is a fragmentary view, oriented according to FIG. 2 and showing certain elements thereof in an alternate position, those elements being in horizontal alignment with the corresponding elements of FIG. 2.

FIG. 7 is a view similar to FIG. 6 but with certain of the elements in still different positions; and FIG. 8 is a view of the main locking and unlocking component of the device showing a modified power operated form, and representing a modification of the central portion of the device of FIG. 1.

Referring in detail to the accompanying drawings, the construction or assembly of the invention is shown in its entirety, identified at 10, in FIG. 1. The assembly includes a frame unit 12 fixedly mounted on the tractor or truck, and a saddle unit 14 mounted on the frame unit for longitudinal sliding movements on the frame unit, in forward and rearward directions, to the right and left of FIG. 1. The frame unit 12 includes a base plate 16 mounted on the frame structure of the tractor represented by channel elements 18 (FIG. 2), in any suitable manner.

At the side edges of the base plate 16 are side rail means 20, 22, made up of horizontal rail elements 20 at the forward end and rail elements 22 at the rearward end. Both are spaced upwardly from the base plate 16, the forward rail elements 20 being spaced by spacers 24, and the rail elements 22 at the rear having upward horizontal extremities 22a and angle pieces 22b, the arrangement being that the rail elements 20 and 22a form a continuous channel 25 longitudinally of the base unit for accommodating the saddle unit 14 in its longitudinal sliding movements.

The spacers 24 have mutually opposed inclined surfaces 26 to form tapered sockets 28 therebetween, spaced longitudinally of the unit for receiving locking elements 30 in respective positions of the saddle unit longitudinally along the assembly. These sockets may be as numerous and spaced apart as desired, but in one example as here, they are seven in number and spaced apart 4 inches so that the saddle member is shiftable throughout a range of 2 feet.

The frame unit 12 includes suitable stop means 32 to prevent overtravel of the saddle unit 14 in its movements longitudinally of the frame unit.

The flanges 20 include overhanging lips 20a (FIG. 2) which are aligned with the elements 22a (FIG. 3) to form the channels 25 between those lips and the base plate 16, which receive the side edges of the saddle plate 36 of the saddle unit 14 to prevent excessive vertical movement of the saddle unit, as referred to again hereinbelow.

Referring now particularly to the saddle unit 14, this unit includes the saddle plate 36 referred to which constitutes the body of the unit and the supporting means for the other elements and members constituting the full saddle unit.

The saddle plate 36 may be a continuous plate extending substantially throughout the dimensions of the saddle unit, and its side edges include upturned elements or flanges 38 disposed in the channels 25. The saddle plate 36 rests on the base plate 16 and the upper edges of the flanges 38 are in close proximity to the overhanging lips 20a, 22a, if not actually engaging them, for limiting vertical movements of the saddle unit, although the saddle unit has a free sliding movement.

Mounted on the saddle unit 14 is the usual fifth wheel 40 mounted in the usual manner, such as in trunnion means 42.

The saddle unit 14 also includes the locking elements 30 referred to above. These locking elements are in the form of plungers 30 slidably mounted in holders or keepers 46 mounted on the saddle plate 36 and arranged for transverse and horizontal sliding movement therein. The locking elements or plungers 30 have tapered outer end elements 48 which engage in the sockets 28 and are of course complementally tapered for fitting therein, the tapering shape facilitating in directing the plungers into the sockets, and the shape also being that when they are fully in those sockets there is a good and firm securement therein. This tapered shape of the plungers and sockets in addition to retaining the locking arrangement in the desired condition, also act to lead the plungers into the sockets so as to eliminate the necessity for great accuracy in positioning the saddle unit at the desired adjusted position.

The locking elements or plungers 30 are biased laterally outwardly by compression springs 50 which at one end engage stop elements 52 secured to the saddle plate and at the other end engage the lock elements or plungers 30, being positioned within a pocket 54 in the latter. Within the compression springs 50 are links 56 connected at their outer ends at 58 with a pin 60 riding in an aperture or slot 63 in the locking element, and at their inner end they are connected to yokes 64 having cam followers 66 riding in slots or cam elements 68 in a cam member 70 mounted on the saddle plate 36 by suitable means such as a shaft 72, and rotatable on that shaft about an axis 74.

The cam member 70 has a radial arm 76 in which is pivotally mounted a link or actuating rod 78 at one end, the other end of which extends through an aperture 80 in a mounting element 82 fixed on the saddle plate 36. The aperture 80 (FIG. 5) is elongated vertically for a purpose stated below. The link 78 has a laterally outwardly positioned element 84 forming a handle for manual manipulation as referred to below. Mounted on the mounting element 82 is a hook 86 pivoted as at 88.

The link 78 is made up of two parts, an inner part 78a and an outer part 78b are secured together as by welding in offset relation, the one part 78a having an end surface 78a' and the other element 78b having an inner end surface 78b', both of the latter forming stop elements.

In the operation of adjusting the saddle plate unit 14 along the frame unit, the locking elements 30 are of course withdrawn from the sockets 28 and to do this the manual actuating means or link 78 is pulled, i.e., in FIG. 4 pulled toward the observer, the handle element 84 being exposed to the side of the vehicle for the convenience of the operator. In pulling that link, the cam member 70 is rotated clockwise, and the cam slots or cam elements 68 work on the cam followers 66 and draw them radially inwardly and pull the locking elements out of the sockets. It will be appreciated of course that the cam slots 68 are eccentric to the axis 74 of the cam member to accomplish that purpose.

The hook element 86 is normally left in hooking position (FIG. 4) in which the link 78 is held downwardly so that the end surface 78a' would engage the element 82 and prevent outward movement of the link, as for example in an accidental situation. When the operator wishes to make the adjustment he throws the hook 86 to unlocking position (FIG. 5) and then he can raise the link 78 and pull it through the slot 80. After he has pulled it the desired extent, and moved the cam member 70 a corresponding extent, the end surface 78b' is beyond the hook and the hook is moved by gravity back into locking position (FIG. 4) and the end surface 78b' engages the hook and prevents the inward accidental withdrawal of the link. The driver then moves the tractor or truck to the desired position according to which one of the sockets 28 represents the desired adjustment.

In accordance with the above description, it is to be pointed out that the locking elements 30 on the opposite sides are balanced, that is, they react against each other, and upon swinging movement of the cam member, the locking elements are moved to unlocking position; thus an even and balanced motion is provided, and any accidental difference in movement of the locking elements that might otherwise cause binding is eliminated.

The foregoing has been found to be a very advantageous mechanism for manual manipulation, but the invention is sufficiently broad to accommodate power movement of the locking elements, and to this end attention is directed to FIG. 8. This construction includes the sockets 28 and the locking elements 30, and the lever means 90 represents the cam member 70 which is actuated by the power means 92 which may be a fluid operated jack or cylinder-piston device under control of the usual fluid pressure system in tractor-trailer vehicles.

What is claimed is:

1. A shiftable fifth wheel construction comprising,
   a tractor frame unit including a body member and a pair of side rails forming opposed longitudinal channels,
   a saddle unit mounted on the frame unit with its opposed longitudinal edges within said opposed longitudinal channels for longitudinal sliding movement on said frame unit,
   the side rails each including a plurality of separate spacer elements having confronting surfaces defining a series of longitudinally spaced sockets directed laterally inwardly toward those of the opposite side rail, and the sockets in the two side rails being equally spaced longitudinally and respectively aligned transversely,
   the saddle unit including locking elements slidable transversely within said channels into and out of aligned ones of the sockets,
   means yieldingly biasing the locking elements outwardly into the sockets and
   common means for moving the locking elements transversely inwardly and thereby withdrawing them from the sockets.

2. A shiftable fifth wheel construction comprising,
   a tractor frame unit including a body member and a pair of side rails forming longitudinal channels,
   a saddle unit mounted on the frame unit for longitudinal sliding movement thereon,
   the side rails each including a series of longitudinally spaced sockets directed laterally inwardly toward those of the opposite side rail, and the sockets in the two side rails being equally spaced longitudinally and respectively aligned transversely,
   the saddle unit including locking elements slidable transversely into and out of aligned ones of the sockets, means yieldingly biasing the locking elements outwardly into the sockets,
   common cam means for moving the locking elements transversely inwardly and thereby withdrawing them from the sockets and including individual cam elements operatively engaging the locking elements, and manually actuatable means for moving the cam means.

3. A shiftable fifth wheel construction according to claim 1 wherein the sockets and locking elements of the locking means are complementally shaped for accomplishing guiding movements of the locking elements into the sockets, and maintaining them in fully fitted position therein.

4. A shiftable fifth wheel construction according to claim 3 wherein said locking elements include a pair of transversely opposed plungers slidably mounted in housings mounted on the saddle unit having laterally outwardly extending end elements engagable in said sockets.

5. A shiftable fifth wheel construction comprising a base plate having a pair of longitudinally extending side rails above said base plate, support spacer elements interposed between said base plate and said side rails thereby forming a channel therebetween, a plurality of said spacer elements having oppositely facing tapered surfaces, the tapered surfaces of adjacent pairs of spacer elements defining tapered sockets, each of said tapered sockets opening toward an opposing side rail with each tapered socket in one side rail being aligned with another tapered socket in the opposing side rail, a saddle unit mounted on a bottom plate having side edges extending into said channel and being slidable therein, said saddle unit also including locking means including a pair of transversely slidable plungers mounted in housings which in turn are mounted on said saddle unit, said plungers having laterally outwardly extending end elements engagable in said tapered sockets; and means for releasably biasing said locking elements laterally outwardly into engagement with said tapered sockets.

* * * * *